Jan. 26, 1926.
T. H. LESTER
1,571,017
SNAP FASTENER
Filed Dec. 8, 1921
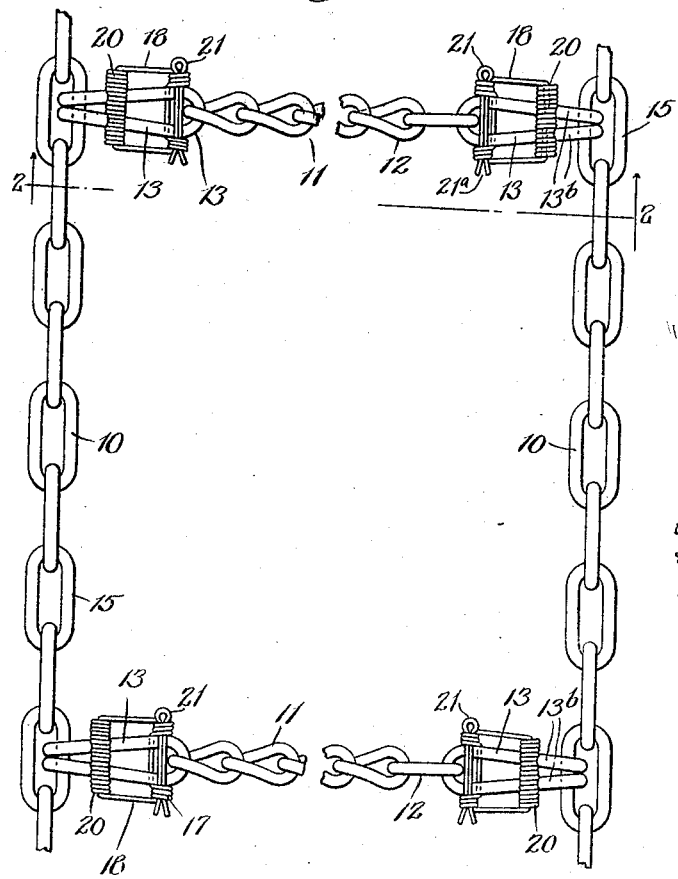
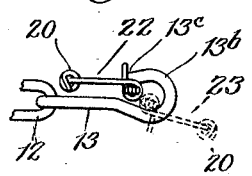
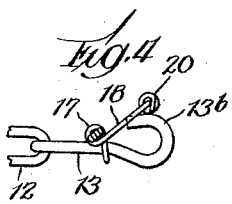
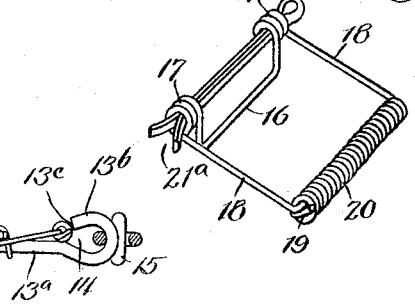
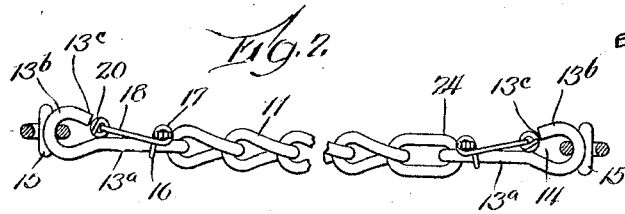
Inventor,
Thomas H. Lester,
by Sheridan, Jones, Sheridan and Smith
Atty's.

Patented Jan. 26, 1926.

1,571,017

UNITED STATES PATENT OFFICE.

THOMAS H. LESTER, OF HIGHLAND PARK, ILLINOIS.

SNAP FASTENER.

Application filed December 8, 1921. Serial No. 520,796.

*To all whom it may concern:*

Be it known that I, THOMAS H. LESTER, a citizen of the United States, residing at Highland Park, in the county of Lake and State of Illinois, have invented certain new and useful Improvements in Snap Fasteners, of which the following is a specification.

This invention relates to an anti-skid chain for use on the pneumatic tires and other tires of automobiles and the like, and its purpose is to provide an improved device whereby the chain may be readily disassembled or repaired.

The principal object is to provide a device which may be readily attached to the cross chain of an anti-skid device for permitting the ready removal of the cross chain from the longitudinal chains to which it is connected. A further object is to provide a detachable device which may be manually manipulated in placing it upon or removing it from the end link of the cross chain. Other objects relate to various features of construction and arrangement which will appear more fully hereinafter.

The nature of the invention will be understood from the following specification taken with the accompanying drawings in which one embodiment is illustrated.

In the drawings—

Figure 1 shows a plan view of a portion of an anti-skid chain embodying the features of the present invention;

Fig. 2 shows a cross sectional view on the line 2—2 of Fig. 1, looking in the direction of the arrows;

Fig. 3 is a partial sectional view similar to Fig. 2 showing the detachable locking device in two different positions during the process of applying it to the end link of the cross chain;

Fig. 4 is a sectional view similiar to Fig. 3 showing the position of the locking device just before it reaches its final position on the chain link; and Fig. 5 shows a perspective view of the locking device.

Fig. 1 shows a partial plan view of an anti-skid chain comprising two longitudinal chains 10, which are adapted to extend annularly around the tire at the sides thereof, the ends of each chain being connected by any suitable device according to the usual practice.

The longitudinal chains 10 are connected by a plurality of cross chains 11, each consisting of a plurality of intermediate links 12 and a pair of end links 13. The end links 13 have elongated loops 13$^a$ which engage the intermediate links 12 and each of these loops terminates in hooks 13$^b$, the ends 13$^c$ of which are spaced from the arms of the opposite loop 13$^a$, leaving an opening 14 to permit the ready connection of the hook with one of the links 15 of the side chain. A permanent connection could be formed between the cross chains and the side chains by bending the hooks 13$^b$ downwardly to close the opening 14 but this arrangement is unsatisfactory in that the cross chains cannot be readily disconnected from the longitudinal chains when they are broken and they therefore cause great inconvenience and annoyance by flying out and striking the fender of the automobile. This difficulty is overcome in the present invention by providing means whereby the openings 14 are normally closed by detachable devices which may be manually manipulated to permit the disconnection of the cross chains from the longitudinal or side chains.

This detachable locking or holding device is formed from a piece of spring wire which is bent into the form shown in Fig. 5, where the device is illustrated as comprising an intermediate U-shaped loop 16, connected at its ends to a spring coil 17, the wire at the ends of the spring being directed outwardly to form two parallel arms 18, which lie in planes extending substantially at right angles to the plane of the loop 16. The ends of the arms 18 are turned inwardly as shown at 19 and these inwardly extending portions engage a cylindrical coil 20 formed from a separate piece of wire. The spring coils 17 are engaged by a cotter pin 21 which is spread apart as shown at 21$^a$ so that it is retained permanently in position, although it can be readily removed when desired. The locking device is thus formed from two pieces of wire which are bent into the form shown, to receive the single cotter pin.

The locking device is assembled on the end links 13 of the cross chains in the manner illustrated in Figs. 3 and 4. The device is first reversed in position so that the ends 13$^c$ of the hook engage the U-shaped loop 16, as shown at 22 in Fig. 3. The device is then passed around the hook as indicated by the dotted position 23 in Fig. 3. After assuming the position shown in Fig. 3, the cotter pin and loop are thrust longitudinally of the link 13 toward the intermediate links 12 and the cross member 20 is elevated and passed over the projecting portion 13ᶜ of the hook, as shown in Fig. 4. Upon further movement of the device toward the intermdiate links, the cross member 20 springs downwardly over the hook and the device assumes its normal position as illustrated in Figs. 1 and 2, where the cotter pin 21 is shown resting upon the upper side of the loop 13ᵃ while the cross member of the U-shaped loop 16 engages the under side thereof. The cotter pin also engages the shoulder 24 of the endmost link 12 while the cross member 20 rests on the upper surfaces of the link 13 in proximity to the ends 13ᶜ of the hook, thereby closing the opening 14 and preventing the disengagement of the hook with the connected link 15 of the longitudinal chain.

If any cross chain 11 becomes broken or otherwise defective, it can be readily removed from the cross chain by seizing the ends of the cross member 20 and bending the arms 18 upwardly against the tension of the spring loops 17 until the link 15 of the longitudinal chains can be passed out of engagement with the hooks 13ᵇ. The locking device can be conveniently manipulated by the fingers of the operator without the necessity of using any tools. The device can be manufactured at small cost and can be readily applied to the cross chains of anti-skid devices by spreading the hooks of the end links to form the openings 14 and then placing the locking devices in position thereon to form detachable closures for these openings.

Although I have shown and described one form of the invention for the purpose of illustration, it will be understood that it may be constructed in various other embodiments without departing from the scope of the appended claims.

What I claim is—

1. A snap fastener comprising an elongated chain link adapted for use as the end link of a chain, said elongated link having a hooked extremity, and a holding device having parts surrounding said elongated link and being adapted to be passed into position on said elongated link over the hooked end thereof and to engage the end link of a chain to which said elongated link is connected, said holding device being retained in place by the next adjacent link of the chain and having a part adapted to be engaged by said hooked extremity.

2. A snap fastener comprising an elongated link having a hooked extremity, and a holding device comprising a U-shaped part adapted to extend under said elongated link, a pin adapted to engage the ends of said U-shaped part and to overlie said elongated link, spring actuated arms extending over the ends of the U-shaped portion, and a cross member carried by said arms and adapted normally to close the opening of said hook.

3. A snap fastener comprising an elongated link, said elongated link having a hooked extremity, a U-shaped member adapted to extend under said elongated link, coil springs connected with the ends of said U-shaped member, a cross pin adapted to extend through said coil springs and to bear against said end link, a pair of arms extending from said coil springs toward said hooked extremity, and a cross member carried by said arms and adapted normally to close the opening of said hook.

4. A snap fastener comprising a U-shaped member, coil springs secured to the ends of said U-shaped member, a cross pin extending between said coil springs, parallel arms extending from said coil springs in a plane located at right angles to the plane of said U-shaped member, and a cross member carried by the ends of said arms.

In testimony whereof I have subscribed my name.

THOMAS H. LESTER.